US011966111B2

(12) United States Patent
Li et al.

(10) Patent No.: US 11,966,111 B2
(45) Date of Patent: Apr. 23, 2024

(54) MICROSTRUCTURED LIQUID CRYSTAL FILM FOR AUTOMOTIVE GLASS

(71) Applicant: Wicue, Inc., Cupertino, CA (US)

(72) Inventors: Fenghua Li, Cupertino, CA (US); Osamu Yamada, Shenzhen (CN); Cai Guo, Shenzhen (CN)

(73) Assignee: Wicue USA INC., Santa Clara, CA (US)

( * ) Notice: Subject to any disclaimer, the term of this patent is extended or adjusted under 35 U.S.C. 154(b) by 0 days.

(21) Appl. No.: 17/874,909

(22) Filed: Jul. 27, 2022

(65) Prior Publication Data

US 2023/0418098 A1 Dec. 28, 2023

Related U.S. Application Data

(60) Provisional application No. 63/355,849, filed on Jun. 27, 2022.

(51) Int. Cl.
| | |
|---|---|
| *G02F 1/1333* | (2006.01) |
| *B32B 3/12* | (2006.01) |
| *B32B 7/12* | (2006.01) |
| *B32B 27/08* | (2006.01) |
| *B32B 27/36* | (2006.01) |

(Continued)

(52) U.S. Cl.
CPC .......... *G02F 1/133377* (2013.01); *B32B 3/12* (2013.01); *B32B 7/12* (2013.01); *B32B 27/08* (2013.01); *B32B 27/36* (2013.01); *B32B 27/365* (2013.01); *B60J 1/001* (2013.01); *G02F 1/13725* (2013.01); *B32B 2250/24* (2013.01); *B32B 2255/10* (2013.01); *B32B 2255/20* (2013.01); *B32B 2264/1021* (2020.08); *B32B 2264/202* (2020.08); *B32B 2605/00* (2013.01);

(Continued)

(58) Field of Classification Search
CPC ..................................................... G02F 1/1333
See application file for complete search history.

(56) References Cited

U.S. PATENT DOCUMENTS

| 5,754,003 A | * | 5/1998 | Murai | ...................... H01J 11/36 345/60 |
| 11,213,429 B1 | * | 1/2022 | Li | ......................... G02F 1/1337 |

(Continued)

FOREIGN PATENT DOCUMENTS

| CN | 102654666 | * | 9/2002 | .......... G02F 1/1333 |
| CN | 102654666 | * | 9/2012 | .......... G02F 1/1333 |

*Primary Examiner* — Sang V Nguyen
(74) *Attorney, Agent, or Firm* — PV IP PC; Wei Te Chung; Zhigang Ma

(57) ABSTRACT

An example liquid crystal film for automotive glass comprises a first base layer, a first conductive layer, a microstructured liquid crystal layer, a second conductive layer, a second base layer, wherein the microstructured liquid crystal layer is disposed between the first conductive layer and the second conductive layer. In one embodiment, the microstructured liquid crystal layer comprises a bottom plate, a partition plate, and a liquid crystal mixture. The partition plate comprises sidewalls vertically arranged on the bottom plate, and the bottom plate is attached to the second conductive layer. The partition plate divides a space between the bottom plate and the first conductive layer into a plurality of polygonal receiving spaces. The liquid crystal mixture is positioned in the plurality of polygonal receiving spaces.

16 Claims, 6 Drawing Sheets

(51) Int. Cl.
*B60J 1/00* (2006.01)
*G02F 1/137* (2006.01)
*G02F 1/1334* (2006.01)

(52) U.S. Cl.
CPC ...... *G02F 1/13345* (2021.01); *G02F 2202/16* (2013.01); *G02F 2203/48* (2013.01)

(56) References Cited

U.S. PATENT DOCUMENTS

| | | | |
|---|---|---|---|
| 2004/0170776 A1* | 9/2004 | Liang | C09K 19/00 428/1.2 |
| 2005/0007651 A1* | 1/2005 | Liang | G02F 1/167 359/296 |
| 2008/0020007 A1* | 1/2008 | Zang | A61K 8/0295 349/92 |
| 2010/0149460 A1* | 6/2010 | Akao | G02F 1/13363 430/319 |
| 2011/0157682 A1* | 6/2011 | Zang | C08G 18/672 359/296 |
| 2012/0013971 A1* | 1/2012 | Wu | G02F 1/167 252/500 |
| 2016/0245968 A1* | 8/2016 | Ichihara | G06V 30/1423 |
| 2018/0011352 A1* | 1/2018 | Kim | G02F 1/134309 |
| 2020/0142246 A1* | 5/2020 | Gim | G02F 1/13725 |
| 2021/0063788 A1* | 3/2021 | Okazaki | G02F 1/133502 |
| 2021/0179941 A1* | 6/2021 | Lan | G02F 1/133377 |

* cited by examiner

MICROSTRUCTURED LIQUID CRYSTAL FILM FOR AUTOMOTIVE GLASS

CROSS REFERENCE TO RELATED APPLICATIONS

This application claims the benefit and priority of U.S. Provisional Application No. 63/355,849, filed Jun. 27, 2022, the content of which is hereby incorporated by reference in its entirety and for all purposes.

FIELD OF THE INVENTION

The present invention relates to the technical field of liquid crystal films, in particular to a liquid crystal film incorporated into a multi-layer structure such as laminated glass assemblies for automotive and other applications.

BACKGROUND

Many advancements have been made to improve the functionality and performance of glass and laminated glass structures, such as in automotive applications. There are numerous locations where glass can be used in current automobiles, such as front and rear windshields, door and window glass, and sunroof glass. These glass areas form parts of a relatively closed cabin of the vehicle and play an important role in shielding the interior of the vehicle from external elements such as wind and rain, maintaining comfortable interior conditions such as proper temperature and humidity, letting in natural light, and allowing the occupants in the vehicle to see the external environment outside the vehicle. With the advancement of material technology, glass incorporating new functions have been introduced, such as dimmable automotive glass.

At present, the production method of dimmable automotive glass is generally to set two layers of ordinary glass opposite to each other, and sandwich a liquid crystal material layer between the two layers of ordinary glass. For automotive glass, glass generally has a certain curvature, so when the liquid crystal material layer is encased by high temperature and high pressure lamination, the liquid crystal material layer will have a certain bending deformation. Typically, the liquid crystal material layer is prone to the phenomenon of bubbles and delamination. The dimming glass that has this phenomenon makes it unqualified and cannot be used. The reason for the low yield is that the liquid crystal material layer often is unable to maintain the original structure due to bending during the lamination process, such that the original dimming effect cannot be achieved.

BRIEF SUMMARY

An example liquid crystal film for automotive glass, according to this disclosure, may comprise a first base layer, a first conductive layer, a microstructured liquid crystal layer, a second conductive layer, a second base layer, wherein the microstructured liquid crystal layer is disposed between the first conductive layer and the second conductive layer, the first base layer and the second base layer are oppositely disposed, the first conductive layer is attached to the first base layer, and the second conductive layer is attached to the second base layer. In one embodiment, the microstructured liquid crystal layer comprises a bottom plate, a partition plate, and a liquid crystal mixture. The partition plate comprises sidewalls vertically arranged on the bottom plate, and the bottom plate is attached to the second conductive layer. The partition plate divides a space between the bottom plate and the first conductive layer into a plurality of polygonal receiving spaces. The liquid crystal mixture is positioned in the plurality of polygonal receiving spaces.

In another embodiment, the microstructured liquid crystal layer comprises a partition plate and a liquid crystal mixture, without a bottom plate. Here, the partition plate comprises sidewalls vertically arranged on the second conductive layer. The partition plate divides a space between the second conductive layer and the first conductive layer into a plurality of polygonal receiving spaces. Once again, the liquid crystal mixture is positioned in the plurality of polygonal receiving spaces.

In one embodiment, the top of the partition plate is bonded to the first conductive layer or the top of the partition plate is not bonded to the first conductive layer. In one embodiment, the polygon storage space is a regular polygon space. In one embodiment, the polygon storage space is a regular hexagonal space. In one embodiment, the polygon storage space is a regular quadrilateral. In one embodiment, the thickness of the bottom plate is 0.01 μm-10 μm. In one embodiment, the thickness of the partition plate is 5 μm-10 μm. In one embodiment, the bottom plate and the partition plate are integrally formed by curing with an adhesive. In one embodiment, the maximum diameter of the polygonal storage space is 30 μm-10 mm. In one embodiment, the liquid crystal mixture is formed by mixing liquid crystal, chiral agent and glue, or by mixing liquid crystal, chiral agent and microparticles. In one embodiment, the first base layer and the second base layer are polyethylene terephthalate (PET) films or polycarbonate (PC) boards. In one embodiment, the first conductive layer and the second conductive layer are transparent conductive layers.

DETAILED DESCRIPTION

Figure 1:
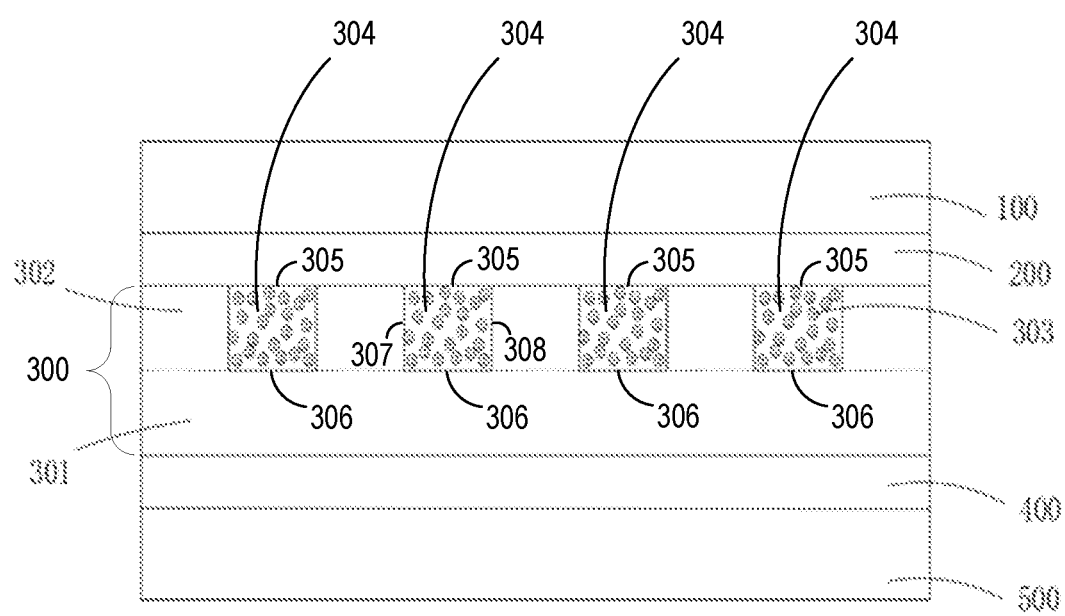
FIG. 1 is a cross-sectional schematic structural diagram of a liquid crystal film (e.g., for automotive glass) incorporating a microstructured liquid crystal layer comprising a partition plate and a bottom plate, according to one embodiment of the present disclosure.

The technical solutions in the embodiments of the present invention will be described below with reference to the accompanying drawings in the embodiments of the present invention. The described embodiments are only some, but not all, embodiments of the present invention. It should be noted that, if there is a directional indications (such as up, down, left, right, front, back, etc.) involved in the embodiment of the present invention, the directional indication is only used to explain the relative positional relationship, movement situation, and the like between the components under a certain posture (as shown in the accompanying drawings). If the specific posture changes, the directional indication changes accordingly. In addition, if there are descriptions involving "first", "second", etc. in the embodiments of the present invention, the descriptions of "first", "second", etc. are only used for the purpose of description, and should not be construed as indicating or implying its relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those of ordinary skill in the art.

Typically, the dimmable automotive glass is made by sandwiching a liquid crystal dimming film. Existing liquid crystal dimming films generally consist of a first substrate, a first conductive layer, a liquid crystal layer, a second conductive layer, and a third conductive layer, and a second substrate. The liquid crystal layer is cured between the two conductive layers by UV-curing the liquid crystal mixture which contains an adhesive. Such a liquid crystal dimming film can be prone to various problems during high temperature and high pressure lamination processing. For example, the internal structure of the liquid crystal film may not be sufficiently stable, especially if the automotive glass also has a certain curvature. During the lamination process of high temperature and high pressure, the dimming film will be deformed to a certain extent, the thickness of the film body will change, and the internal liquid crystal molecules will flow, so as to produce unqualified products or products that cannot be used, and the yield rate is very low. Generally speaking, the structure of the liquid crystal layer is relatively weak, and it can deform during the lamination process. The resulting dimming glass may have uneven brightness from a macro perspective.

According to various embodiments of the present disclosure, a liquid crystal film (e.g., for automotive glass) incorporates a microstructured liquid crystal layer to enhance the structural stability of the liquid crystal film while maintaining the thickness of the liquid crystal film and optical qualities of the glass structure without introducing undesirable distortions. The detrimental effects of high temperature and high pressure on the liquid crystal film when the dimming glass is sandwiched with the liquid crystal film can be reduced. Use of a liquid crystal film according to one or more embodiments of the present disclosure can also significantly increase production yield in the manufacturing of dimming glass.

According to certain embodiments, a liquid crystal film (e.g., for automotive glass) includes a first substrate layer (also referred to as a "first base layer"), a first conductive layer, a microstructured liquid crystal layer, a second conductive layer, and a second substrate layer (also referred to as a "second base layer"), which are arranged in sequence. The microstructured liquid crystal layer is arranged between the first conductive layer and the second conductive layer, the first base layer and the second base layer are oppositely arranged. The first conductive layer is attached to the first base layer, and the second conductive layer is attached to the second base layer.

The microstructured liquid crystal layer includes a bottom plate, a partition plate (also referred to as a "spacer," a "spacer layer," a "fixed spacer," a "fixed spacer layer," a "separator," or a "separator layer"), and a liquid crystal mixture, the partition plate is vertically arranged on the bottom plate, and the bottom plate is pasted (e.g., bonded) on the second conductive layer. The spacer divides the space between the bottom plate and the first conductive layer into a plurality of polygonal receiving spaces (also referred to as "storage spaces"), and the liquid crystal mixture is poured into the polygonal receiving spaces. The term "microstructured" is used herein to refer to a component or material that comprises multiple, repeated structures each having relatively small physical dimensions, e.g., a maximum lateral diameter of 10 mm. In the present disclosure, each instance of a microstructured liquid crystal film can also be referred to as a structured liquid crystal film. Each instance of a microstructured liquid crystal layer may be referred to as a structured liquid crystal layer.

A liquid crystal film (e.g., for automobile glass) according to embodiments of the present disclosure significantly improves the ability of the liquid crystal film to resist deformation under significant heat and pressure, such as during an automobile glass lamination process, while maintaining optical qualities and avoiding distortion. According to embodiments of the disclosure, a liquid crystal film is provided with microstructures in a microstructured liquid crystal layer. For example, a microstructured liquid crystal layer may comprise a partition plate and a bottom plate. The space between the first conductive layer and the second conductive layer may be partitioned by the partition plate and the bottom plate into numerous polygonal receiving spaces. A liquid crystal mixture is poured into each of the polygonal storage space. The structure of the liquid crystal film arranged in this way is strong and stable, which is suitable for the production of multi-layer glass structures and particularly well adapted to the laminating process of high temperature and high pressure in the production of laminated glass structures (e.g., automotive dimming glass). According to embodiments of the present disclosure, the liquid crystal mixture is confined in the polygonal receiving (storage) spaces. This can prevent the liquid crystal molecules from sinking and sagging, which if left unremedied can seriously degrade the dimming effect of the liquid crystal film.

In various embodiments, the liquid crystal used in the liquid crystal mixture is one of guest host (GH) liquid crystal, twisted nematic (TN) liquid crystal, vertically aligned (VA) liquid crystal, electronically controlled birefringence (ECB) liquid crystal, polymer-dispersed liquid crystal (PDLC) liquid crystal, polymer network liquid crystal (PNLC) liquid crystal, and polymer stabilized cholesteric texture (PSCT) liquid crystal. In certain embodiments, a GH liquid crystal material is used to achieve desired light and shade dimming properties. The structural stability of the microstructured liquid crystal layer allows the liquid crystal film to be bent and deformed while maintaining the same thickness, which also makes the liquid crystal film suitable for roll-to-roll production.

FIG. 1 is a cross-sectional schematic structural diagram of a liquid crystal film (e.g., for automotive glass) incorporating a microstructured liquid crystal layer comprising a partition plate and a bottom plate, according to one embodiment of the present disclosure. As shown, the liquid crystal film may comprise a first base layer 100, a first conductive layer 200, and a microstructured liquid crystal layer arranged in sequence 300, a second conductive layer 400, and a second base layer 500. The microstructured liquid crystal layer 300 is disposed between the first conductive layer 200 and the second conductive layer 400, and the first base layer 100 and the second base layer 500 are disposed opposite to each other. The first conductive layer 200 is attached to the first base layer 100, and the second conductive layer 400 is attached to the second base layer 500.

The microstructured liquid crystal layer 300 includes a bottom plate 301, a partition plate 302, and a liquid crystal mixture 303. The partition plate 302 comprises sidewalls vertically disposed on the bottom plate 301, and the bottom plate 301 is bonded to the second conductive layer 400. The partition plate 302 divides the space between the bottom plate 301 and the first conductive layer 200 into a plurality of polygonal receiving spaces 304, and the liquid crystal mixture 303 is poured into the polygonal receiving spaces 304. In this embodiment, the bottom plate 301 is perpendicular to the sidewalls of the partition plate 302.

In this embodiment, the bottom plate 301 and the partition plate 202 are formed as a unit or bonded to one another, the bottom of the bottom plate 301 is firmly adhered to the second conductive layer 400, and the top of the partition plate 302 is firmly adhered to the first conductive layer 200. This can ensure that the microstructured liquid crystal layer 300, the first conductive layer 200 and the second conductive layer 400 are combined into a stable whole, which ensures that the thickness of the liquid crystal film will not locally increase or decrease due to bending during the deformation process. Here, each polygonal storage space 304 is a regular hexagonal space. Setting the polygonal storage space 304 into a regular hexagonal structure can make the microstructured liquid crystal layer 300 have higher strength and better resistance to high temperature and high pressure.

In some embodiments, the bottom plate 301 and the partition plate 302 are integrally formed. In particular, the bottom plate 301 and the partition plate 302 may be formed as an integrated unit comprising a compression molded and cured polymer material. The polymer material may comprise a UV-curable material such as an adhesive (e.g., glue). One example of a process for forming the partition plate is described below. First, the UV-curable material is deposited at the desired location, e.g., sprayed onto the second conductive layer 400. Then, a mold is used to imprint the UV-curable material. A rigid mold having a shape representing negative impression of the polygonal receiving spaces 304 may be used. The rigid mold is pressed against the UV-curable material, which is deformable at this point, prior to UV curing. The mold thus imparts the proper shapes onto the UV-curable material, to form the polygonal receiving spaces 304 within the UV-curable material. The UV-curable material is then irradiated with UV light, so that the UV-curable material is cured to integrally form the bottom plate 301 and the partition plate 302.

In one example, the bottom plate 301 is formed as result of pressing the mold against UV-curable material only to a certain extent along the vertical axis, so as to leave a layer of UV-curable material between the bottom of the polygonal receiving spaces 304 and the second conductive layer 400. This effectively results in two regions (or strata) of UV-curable material. The first region of UV-curable material forms the partition plate 302, and the second region of the UV-curable material forms the bottom plate 301. The UV-curable material is then cured by irradiation and separated from the mold, to form an integral unit that comprises the partition plate 302 and the bottom plate 301. During operation of the liquid crystal film, the bottom plate 301 may isolate any liquid crystal material positioned within the polygonal storage space 304 from the second conductive layer 400, so as to have a good insulating effect.

Here, each of the plurality of polygonal receiving spaces 304 is bounded by: (1) a planar top surface 305 defined by the first conductive layer 200, (2) a planar bottom surface 306 defined by the bottom plate 301, and (3) a plurality of side surfaces such as 307 and 308 defined by a plurality of the sidewalls of the partition plate. In some embodiments, each planar bottom surface 306 has a generally planar, i.e., flat, contour that is parallel to the horizontal surfaces of the first base layer 100, first conductive layer 200, microstructured liquid crystal layer 300, second conductive layer 400, and second base layer 500. Notably, in these embodiments, the planar bottom surface 306 defined by the bottom plate 301 is devoid of any bumps, protrusion, or other three-dimensional features. Such bumps or protrusion may cause light scattering, especially if a mismatch exists between the index of refraction of the material from which the bottom plate 301 is constructed and the index of refraction of the liquid crystal mixture. Furthermore, the alignment of liquid crystal molecules adjacent to such bumps or protrusions may conform to the local surface orientations of the bumps and protrusions, which may be different from that of the horizontal surfaces of the layers of the liquid crystal film. The alignment of nearby liquid crystal molecules may also be impacted. This results in non-uniform orientations exhibited in the alignment of liquid crystal molecules and negatively impact the dimming performance of the liquid crystal film. By maintaining the planar shape of the interface with the liquid crystal material, the planar bottom surface 306 of the bottom plate 301 promotes improved optical qualities and dimming performance of the liquid crystal film incorporating the microstructured liquid crystal layer 300. The planar top surface 305 defined by the first conductive layer 200 may serve a similar purpose when used in conduction with the planar bottom surface 306 defined by the bottom plate 301.

The liquid crystal mixture 303 may be formed by mixing liquid crystals, a chiral agent, and a UV-curable polymer material. Optionally, microparticles may also be added to the mixture. One of the chiral agents commonly used in the market may be selected, such as chiral agent S811. The microparticles are transparent and have little effect on light refraction, such as silicon spheres. In one embodiment, the first base layer 100 and the second base layer 500 are polyethylene terephthalate (PET) films. Other materials suitable for the base material can also be selected as the base layer according to the needs of the actual situation, such as a transparent polycarbonate (PC) board, transparent glass, etc.

Further, the first conductive layer 200 and the second conductive layer 400 are transparent conductive layers. In this embodiment, the first conductive layer 200 and the second conductive layer 400 are both indium tin oxide (ITO) conductive layers. The first conductive layer 200 is a transmitting electrode, and the second conductive layer 400 is a receiving electrode, so that a stable electric field is formed between the first conductive layer 200 and the second conductive layer 400. Electrical charges can flow from the transmitting electrode, through the microstructured liquid crystal layer 300 including the liquid crystal mixture 303, to the receiving electrode. In this way, the microstructured liquid crystal layer 300 can be stably driven to change states. The liquid crystal film for automobile glass also includes a controller (not shown in the figure), and the controller is provided with a control circuit. The first conductive layer 200 and the second conductive layer 400 are electrically connected to the control circuit, and the electric field between the first conductive layer 200 and the second conductive layer 400 is controlled by the controller.

According to various embodiments, the liquid crystal used in the liquid crystal mixture 303 is one of guest host (GH) liquid crystal, twisted nematic (TN) liquid crystal, vertically aligned (VA) liquid crystal, electronically controlled birefringence (ECB) liquid crystal, polymer-dispersed liquid crystal (PDLC) liquid crystal, polymer network liquid crystal (PNLC) liquid crystal, or polymer stabilized cholesteric texture (PSCT) liquid crystal.

In one embodiment, GH liquid crystal is used in the liquid crystal mixture 303, in order to achieve stepless dimming of light and dark, which may promote an improved user experience in certain circumstances. Using GH guest-host dye liquid crystal, dissolving the dichroic dye in the liquid crystal constitutes a kind of guest-host relationship, the liquid crystal is the host (Host), and the dichroic dye is the guest (Guest). Under the action of the external electric field, the dye molecules rotate with the liquid crystal molecules, and the dichroic dye has the property of anisotropy of light absorbance. According to the azimuthal relationship between the absorption axis of the dye molecule and the molecular axis, the dichroic dye can be divided into positive (P-type) dichroic dyes and negative (N) dichroic dyes. When the E vector of the ray is perpendicular to the optic axis of the dye, the ray is substantially passed; however, when the E vector of the ray is parallel to the optic axis of the dye, the ray is substantially absorbed. This type of dye is a positive dichroic dye, and the negative dichroic dye is just the opposite. According to the characteristics of the positive and negative dyes, light is absorbed or transmitted, thereby changing the transmittance of the microstructured liquid crystal layer 300. Therefore, this type of liquid crystal becomes a guest-host (GH) type liquid crystal. Since the guest-host type liquid crystal can selectively transmit light by using a dichroic dye without a polarizer, it can meet the performance requirements of the microstructured liquid crystal layer 300, and can achieve the light and dark adjustment of the liquid crystal film can maintain the effect of high transparency, and the color of the liquid crystal film when the liquid crystal film is in a dark state can also be adjusted by the color of the dichroic dye. In another embodiment, if the automotive glass made of the liquid crystal film of the present invention wants to have the effect of privacy glass, one of PDLC liquid crystal, PNLC liquid crystal and PSCT liquid crystal is selected, preferably PNLC liquid crystal.

Figure 2:
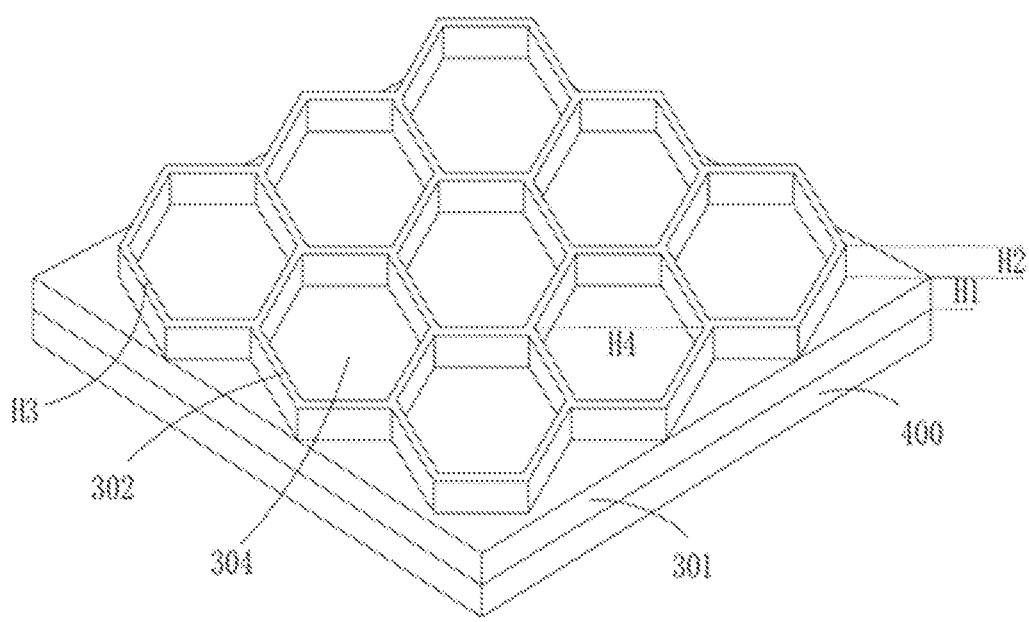
FIG. 2 is three-dimensional view showing a hexagonal design for the partition plate of the microstructured liquid crystal layer as well as the second conductive layer of the liquid crystal film presented in FIG. 1.

FIG. 2 is three-dimensional view showing a hexagonal design for the partition plate of the microstructured liquid crystal layer as well as the second conductive layer of the liquid crystal film presented in FIG. 1. According to some embodiments, the thickness of the bottom plate 301 is 0.01 μm-10 μm. In this embodiment, the thickness of the bottom plate 301 is preferably 10 μm. As shown in FIG. 2, the thickness of the bottom plate 301 is H1. According to some embodiments, the thickness of the partition plate 302 is 5 μm-10 μm. In this embodiment, the thickness of the partition plate 302 is preferably 10 μm. As shown in FIG. 2, the thickness of the partition plate 302 is H2, the width of each sidewall of the partition plate 302 is H3, and H3 is equal to 10 μm. In some embodiments, the maximum lateral diameter of the polygonal storage space 304 is 30 μm-10 mm. In the embodiment shown in this figure, the polygonal storage space 304 is a regular hexagon. The straight line distance of the diagonal lines of the regular hexagon is the maximum lateral diameter length of the polygonal storage space 304, and the maximum lateral diameter length is set to a particular value, such as 5 mm. As shown in FIG. 2, the maximum lateral diameter is labeled as H4. A process for assembling a liquid crystal film structure according to an embodiment of the disclosure is presented in the steps outlined below.

Step 1: First, two transparent PET films are selected as the first base layer 100 and the second base layer 500, respectively. Then, an ITO conductive layer is plated on one side of both the first base layer 100 and the second base layer 500 to obtain a bonding film of two base layers and conductive layers.

Step 2: Using light-curing glue on the bonding film of the second base layer 500 made in Step 1, the integrated structure of the bottom plate 301 and the partition plate 302 is produced by die imprinting. The bottom of the bottom plate 301 is tightly adhered to the second conductive layer 400.

Step 3: The liquid crystal mixture 303 is configured, mixed with GH type liquid crystal and chiral agent S811, and then mixed with microparticles.

Step 4: Pour the liquid crystal mixture 303 produced in Step 3 into the polygonal storage space 304.

Step 5: Cover the bonding film of the first base layer 100 made in Step 1 over the partition plate 302, and make the first conductive layer 200 and the partition plate 302 tightly adhered.

Step 6: Seal the edges of the film body completed in Step 5.

The above six steps are a brief description of the production process of the liquid crystal film for automotive glass in the present invention. The specific amount of the material needs to be weighed according to the actual demand, which can be easily measured for those skilled in the art, so it will not be elaborated here.

Figure 3:
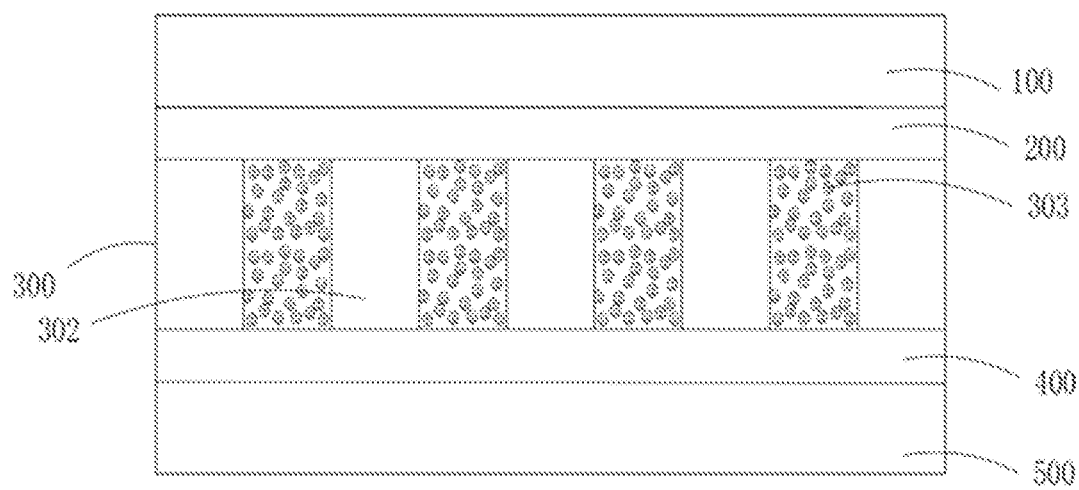
FIG. 3 is a cross-sectional schematic structural diagram of a liquid crystal film (e.g., for automotive glass) incorporating a microstructured liquid crystal layer comprising a partition plate, according to one embodiment of the present disclosure.

FIG. 3 is a cross-sectional schematic structural diagram of a liquid crystal film (e.g., for automotive glass) incorporating a microstructured liquid crystal layer comprising a partition plate, according to one embodiment of the present disclosure. As shown, the liquid crystal film may comprise a first base layer 100, a first conductive layer 200, a microstructured liquid crystal layer 300, second conductive layer 400, second base layer 500. The microstructured liquid crystal layer 300 is disposed between the first conductive layer 200 and the second conductive layer 400, and the first base layer 100 and the second base layer 500 are disposed opposite to each other. The first conductive layer 200 is attached to the first base layer 100, and the second conductive layer 400 is attached to the second base layer 500.

The microstructured liquid crystal layer 300 includes a partition plate 302 and a liquid crystal mixture 303. The partition plate 302 comprises sidewalls vertically disposed on the second conductive layer 400. The upper and lower ends of the partition plate 302 are firmly adhered to the first conductive layer 200 and the second conductive layer 400, respectively. The partition plate 302 divides the space between the second conductive layer 400 and the first conductive layer 200 into a plurality of polygonal receiving spaces 304. Each polygonal storage space 304 is a regular hexagonal space, and the liquid crystal mixture 303 is poured into the polygonal storage spaces 304.

Referring still to FIG. 3, the bottom of the partition plate 302 is firmly adhered to the second conductive layer 400, and the top of the partition plate 302 is firmly adhered to the first conductive layer 200. This can ensure that the microstructured liquid crystal layer 300, the first conductive layer 200 and the second conductive layer 400 are combined into a stable whole, which ensures that the thickness of the liquid crystal film will not locally increase or decrease due to bending during the deformation process. Each polygonal storage space 304 is a regular hexagonal space. Setting the polygonal storage space 304 into a regular hexagonal structure can make the microstructured liquid crystal layer 300 have higher strength and better resistance to high temperature and high pressure.

Here, each of the plurality of polygonal receiving spaces 304 is bounded by: (1) a planar top surface defined by the first conductive layer 200, (2) a planar bottom surface defined by the second conductive layer 400, and (3) a plurality of side surfaces defined by a plurality of the sidewalls of the partition plate. In some embodiments, each planar bottom surface 306 has a generally planar, i.e., flat, contour that is parallel to the horizontal surfaces of the first base layer 100, first conductive layer 200, microstructured liquid crystal layer 300, second conductive layer 400, and second base layer 500. Notably, in these embodiments, the planar bottom surface 306 defined by the second conductive layer 400 is devoid of any bumps, protrusion, or other three-dimensional features. Such bumps or protrusion may cause light scattering, especially if a mismatch exists between the index of refraction of the material from which the bottom plate 301 is constructed and the index of refraction of the liquid crystal mixture. Furthermore, the alignment of liquid crystal molecules adjacent to such bumps or protrusions may conform to the local surface orientations of the bumps and protrusions, which may be different from that of the horizontal surfaces of the layers of the liquid crystal film. The alignment of nearby liquid crystal molecules may also be impacted. This results in non-uniform orientations exhibited in the alignment of liquid crystal molecules and negatively impact the dimming performance of the liquid crystal film. By maintaining the planar shape of the interface with the liquid crystal material, the planar bottom surface 306 of the second conductive layer 400 promotes improved optical qualities and dimming performance of the liquid crystal film incorporating the microstructured liquid crystal layer 300. The planar top surface 305 defined by the first conductive layer 200 may serve a similar purpose when used in conduction with the planar bottom surface 306 defined by the second conductor layer 400.

The biggest difference between this embodiment and embodiment shown in FIGS. 1 and 2 is that, in the microstructured liquid crystal layer 300, the space for storing the liquid crystal mixture 303 is formed through the partition plate 302 without a bottom plate. The upper and lower ends of the partition plate 302 are respectively attached to the first conductive layer 200 and the second conductive layer 400. The production steps of the embodiment shown in FIG. 3 may be similar to those of the embodiment shown in FIGS. 1 and 2. The manufacturing process for the embodiment shown in FIG. 3 may be simpler. In particular, during pre-curing molding, the mold used to form the polygonal receiving spaces 304 may be pressed all the way down toward the second conductive layer 400, such that the bottom of the mold makes contact with the top surface of second conductive layer 400. In this manner, there is no need to control the downward force or pressure of the mold during imprinting in order to carefully limit the extent of vertical travel of the mold against the UV-curable material and leave a portion of the UV-curable material to serve as a bottom plate. Instead, the mold makes contact with the second conductive layer 400, such that the top surface of the second conductive layer 400 effectively serves as the bottom surface of the polygonal receiving spaces 304.

Figure 4:
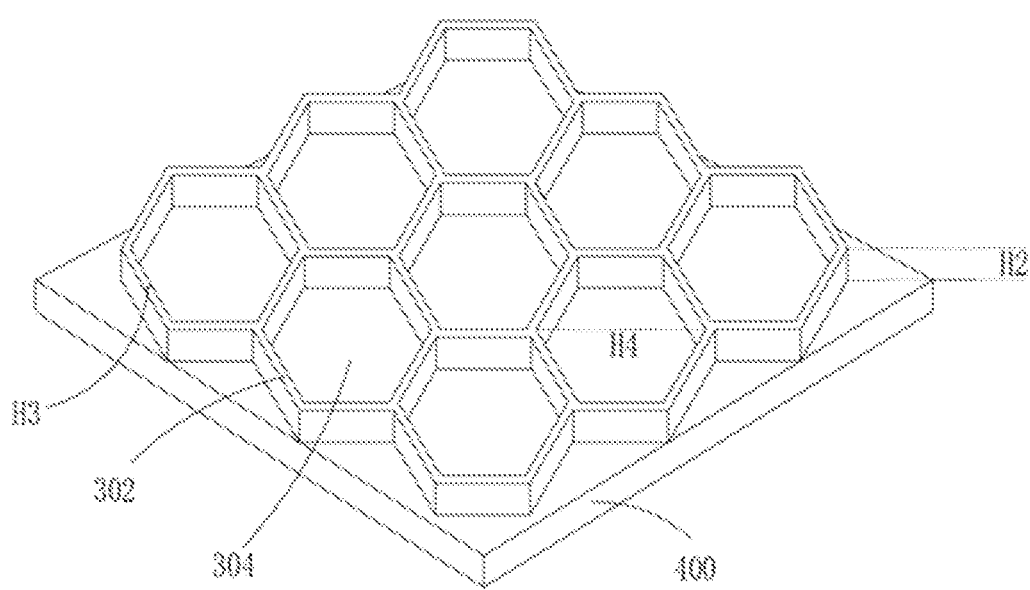
FIG. 4 is three-dimensional view showing a hexagonal design for the partition plate of the microstructured liquid crystal layer as well as the second conductive layer of the liquid crystal film presented in FIG. 3.

FIG. 4 is three-dimensional view showing a hexagonal design for the partition plate of the microstructured liquid crystal layer as well as the second conductive layer of the liquid crystal film presented in FIG. 3. The hexagonal storage space 304 can be implemented in embodiments with or without a bottom plate 301. As shown in FIG. 4, the microstructured liquid crystal layer 300 includes a partition plate 302 and a liquid crystal mixture 303. The partition plate 302 is vertically arranged on the second conductive layer 400. The spacer 302 divides the space between the bottom plate 301 and the first conductive layer 200 into a plurality of polygonal storage spaces 304, and the polygonal storage spaces 304 are regular hexagons. The liquid crystal mixture 303 is poured into the polygonal receiving space 304. According to some embodiments, the thickness of the partition plate 302 is 5 µm-10 µm. In this embodiment, the thickness of the partition plate 302, labeled as H2, is 10 µm. The width of each sidewall of the partition plate 302 may be equal to 10 µm. In some embodiments, the maximum lateral diameter (labeled as H4) of the polygonal storage space 304 is 30 µm-10 mm. In the embodiment shown in this figure, the polygonal storage space 304 is a regular hexagon. A process for assembling a liquid crystal film structure according to an embodiment of the disclosure is similar to that described previously in connection with FIG. 2. However, as discussed, the liquid crystal film may be formed without a bottom plate, which can further simply the manufacturing procedure.

In one implementation, this embodiment has the following features: The liquid crystal mixture 303 is made by mixing GH liquid crystal, chiral agent and glue; The top of the spacer 302 is not bonded to the first conductive layer 200. The glue used is light-curing glue, and the top of the partition plate 302 does not need to be pasted with the first conductive layer 200. Then, when the first base layer 100 and the second base layer 500 are laminated, the process is simpler and the operation is convenient.

Figure 5:
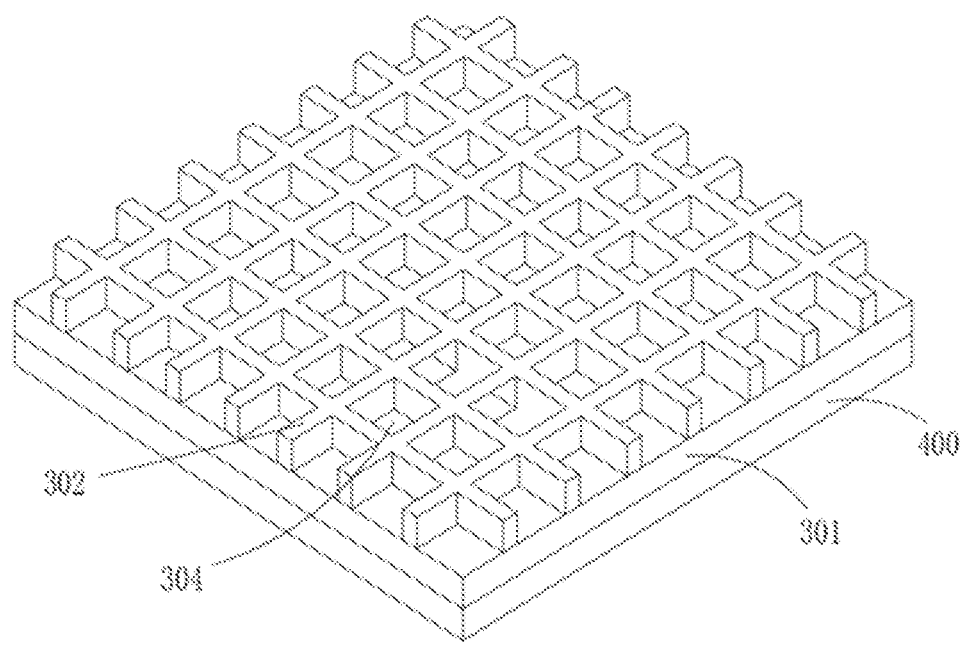
FIG. 5 is three-dimensional view showing a rectangular design for the partition plate of the microstructured liquid crystal layer as well as the second conductive layer of the liquid crystal film presented in FIG. 1 or FIG. 3.

FIG. 5 is three-dimensional view showing a rectangular design for the partition plate of the microstructured liquid crystal layer as well as the second conductive layer of the liquid crystal film presented in FIG. 1 or FIG. 3. Once again, the liquid crystal film may comprise a first base layer 100, a first conductive layer 200, a microstructured liquid crystal layer 300, a second conductive layer 400, and a second base layer 500 arranged in sequence. The microstructured liquid crystal layer 300 is disposed between the first conductive layer 200 and the second conductive layer 400, and the first base layer 100 and the second base layer 500 are disposed opposite to each other; The first conductive layer 200 is attached to the first base layer 100, and the second conductive layer 400 is attached to the second base layer 500.

As shown in FIG. 5, the microstructured liquid crystal layer 300 includes a bottom plate 301, and a partition plate 302. The partition plate 302 comprises a plurality of sidewall that are vertically arranged on the bottom plate 301. The bottom plate 301 is bonded to the second conductive layer 400. The partition plate 302 divides the space between the bottom plate 301 and the first conductive layer 200 into a plurality of polygonal storage spaces 304. Here, each of the polygonal storage spaces 304 is a regular quadrilateral. The liquid crystal mixture 303 is positioned (e.g., poured) into the polygonal storage spaces 304.

Compared to previously described embodiments, the embodiment shown in FIG. 5 has a different shape for the polygonal storage spaces formed by the partition plate 304.

While the embodiments shown in FIGS. 1-4 exhibit regular hexagonal storage spaces, the embodiment shown in FIG. 5 exhibit regular quadrilateral storage spaces. Notably, the rectangular storage spaces of the partition plate 304 can be implemented in embodiments with or without a bottom plate 301. Other aspects of the embodiment, such as the process for manufacturing the liquid crystal film and the microstructured liquid crystal layer 300, may be similar as that described with respect to FIGS. 1-4.

Figure 6:
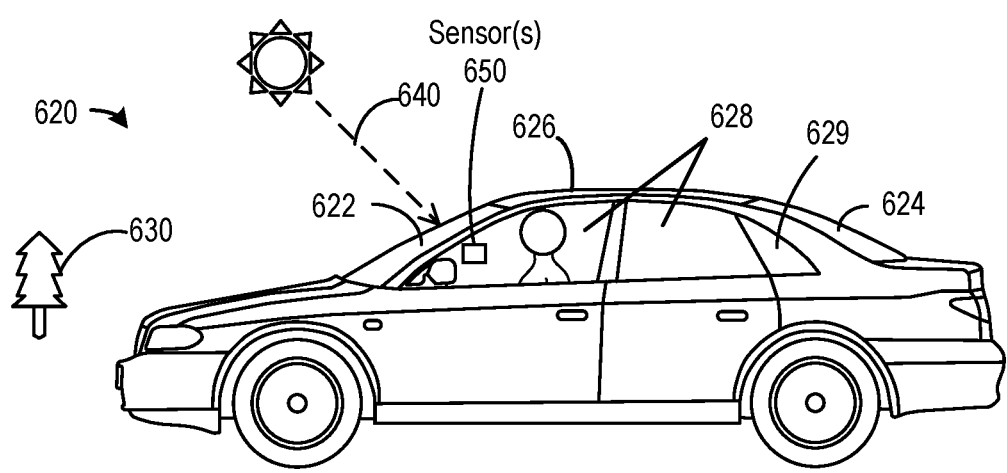
FIG. 6 illustrates an example of an environment in which a liquid crystal (LC) assembly according to various embodiments disclosed can be used.

FIG. 6 illustrates an example of an environment in which a liquid crystal (LC) assembly according to various embodiments disclosed can be used. As depicted in FIG. 6, an automobile 620 can include a front windshield (also known as a windscreen) 622, a rear windshield 624, a sunroof 626, and side windows 628. In the example of FIG. 1, automobile 620 further includes a quarter glass window 629. Quarter glass windows are generally smaller than the side windows of an automobile and are usually located above a rear wheel or next to a side-view mirror. Due to its location relative to the body of the automobile, a quarter glass window is usually substantially triangular. In general, each of the windows 622, 624, 626, 128, and 629 is curved, with the degree of curvature varying across windows. For instance, a window of automobile 620 may exhibit a three-dimensional curvature such that one surface of the window is convex (e.g., a surface facing the exterior environment) and an opposing (e.g., inner) surface is concave. In the example of FIG. 6, an LC assembly can form or be retrofitted onto any of the windows 622, 624, 626, 628, and 629. The automobile 620 can also include one or more sensors 650 which, as discussed below, can be used to control the dimming of an LC assembly in the automobile 620.

Vehicles can move between different lighting situations rapidly, for example, going from an open road that is well lit by sunlight to a darkened tunnel. Because the lighting situation is subject to change, it can be beneficial to make at least some of the windows 622, 624, 626, 628, or 629 dimmable. For instance, making the front windshield 622 dimmable could increase the comfort of the driver, and therefore driving safety, if the dimming of the front windshield 622 were controlled to reduce light transmittance when the ambient environment is relatively bright and/or to increase light transmittance when the ambient environment is relatively dark. Dimming can be performed to, for example, prevent the driver from being blinded or dazzled when the intensity of the ambient light is above a threshold (e.g., when the front windshield 622 or a portion of the front windshield 622 that is near the driver receives direct sunlight 640) or when transitioning to a brighter environment after the driver's eyes have become dark-adapted from being in a darker environment for a threshold period of time. Such dimmable operation can also improve the ability of the driver to see road and environmental features 630 and thereby improve safety.

Dimming can be controlled in other ways to enhance safety and/or comfort for a driver or passenger of an automobile. For instance, prolonged exposure to bright light, especially sunlight, tends to increase the temperature within the cabin of an automobile. Light transmittance can therefore be decreased based on the cabin temperature being above a threshold. Dimming can be performed based on the amount of ambient light, temperature, temperature in combination with the amount of ambient light, and other factors or combinations of factors. Accordingly, in some embodiments, the one or more sensors 650 may include an optical sensor and/or other type of sensor (e.g., a temperature sensor, or light intensity sensor) that is deployed together with a dimmable LC assembly and a control unit configured to vary the light transmittance of the dimmable LC assembly based on data from the sensor(s). Such sensors 650 can be in various locations throughout the automobile 620 and, in some instances, may be integral with or attached to a window, e.g., as part of an LC assembly.

Another example of a sensor 650 that can be used to control dimming is an occupant sensor configured to detect the presence of a person in the automobile 620, for example, based on a seatbelt being engaged, pressure of the occupant's bodyweight against a seat, capturing an image of the occupant by an in-vehicle camera, and so on. The light transmittance of a window near or facing an occupant can be controlled to increase the occupant's comfort, and occupant sensing can be incorporated into a decision of the control unit as to whether to adjust transmittance and, if so, to what extent. For example, it may be unnecessary to adjust the transmittance of a window when there is no occupant facing the window. This may be true even in the case of the front windshield 622, as the automobile 620 could be a self-driving or teleoperated vehicle with no person sitting in the driver's seat.

Although dimmable LC assemblies exist for use in other types of applications, incorporating a dimmable LC assembly into a window in a safety critical environment is challenging. As indicated above, the windows 622, 624, 626, 628, or 629 are generally curved. Thus, a dimmable LC assembly should also be curved or capable of conforming to the curvature of a window to which the dimmable LC assembly is applied. Further, automobile windows are often subject to stringent regulations designed to ensure safety. For example, Regulation No. 43 of the Economic Commission for Europe of the United Nations sets forth various performance requirements for different types of vehicle windows. Types of windows governed by Regulation No. 43 include "toughened-glass" (a single layer of glass that has been specially treated to increase its mechanical strength and to condition its fragmentation after shattering), "laminated-glass" (two or more layers of glass held together by one or more interlayer of plastic material), "treated laminated glass" (where at least one of multiple glass layers has been specially treated to increase its mechanical strength and to condition its fragmentation after shattering), and "ordinary laminated glass" (where none of the glass layers has been treated). Embodiments of the present disclosure support the production of LC assemblies with curvatures that meet and exceed safety and operational requirements. Specifically, LC assemblies that require lamination involving high heat and pressure that might otherwise damage or destroy liquid crystal structures can be realized using various embodiments of the microstructured liquid crystal film described herein.

It should be noted that the technical solutions of the various embodiments of the present invention may be combined with each other, but must be based on the realization by those skilled in the art. When the combination of technical solutions contradicts each other or cannot be realized, it should be considered that such combination of technical solutions does not exist and does not fall within the protection scope of the present invention.

The above descriptions are only preferred embodiments of the present invention, and are not intended to limit the patent scope of the present invention. All equivalent structural transformations made by using the contents of the description and drawings of the present invention, or directly or indirectly applied in other related technical fields, are similarly included in the scope of patent protection of the present invention.

What is claimed is:

1. A liquid crystal film for automotive glass, the liquid crystal film comprising:
   a first base layer;
   a first conductive layer;
   a microstructured liquid crystal layer;
   a second conductive layer; and
   a second base layer, wherein:
   the microstructured liquid crystal layer is disposed between the first conductive layer and the second conductive layer,
   the first base layer and the second base layer are oppositely disposed,
   the first conductive layer is attached to the first base layer,
   the second conductive layer is attached to the second base layer,
   the microstructured liquid crystal layer comprises:
   a bottom plate;
   a partition plate; and
   a liquid crystal mixture, and wherein:
   the partition plate comprises sidewalls vertically arranged on the bottom plate, and the bottom plate is attached to the second conductive layer without a liquid crystal mixture therebetween,
   the partition plate divides a space between the bottom plate and the first conductive layer into a plurality of polygonal receiving spaces, and
   the liquid crystal mixture is positioned in the plurality of polygonal receiving spaces,
   wherein a top surface of the sidewalls of the partition plate and the liquid crystal mixture directly contact the first conductive layer,
   wherein a planar bottom surface of each of the plurality of polygonal receiving spaces is flat, and
   wherein the bottom plate is disposed between the liquid crystal mixture and the second conductive layer and between the partition plate and the second conductive layer.

2. The liquid crystal film of claim 1, wherein each of the plurality of polygonal receiving spaces is bounded by: (1) a planar top surface defined by the first conductive layer, (2) the planar bottom surface defined by the bottom plate, and (3) a plurality of side surfaces defined by a plurality of the sidewalls of the partition plate.

3. The liquid crystal film of claim 1, wherein the bottom plate and the partition plate are formed as an integrated unit.

4. The liquid crystal film of claim 3, wherein the integrated unit comprises a compression molded and cured polymer material.

5. The liquid crystal film of claim 1, wherein each of the plurality of polygonal receiving spaces is a polygonal space.

6. The liquid crystal film of claim 5, wherein each of the plurality of polygonal receiving spaces is a regular hexagonal space.

7. The liquid crystal film of claim 5, wherein each of the plurality of polygonal receiving spaces is a regular quadrilateral space.

8. The liquid crystal film of claim 1, wherein the bottom plate has a thickness of 0.01 μm-10 μm.

9. The liquid crystal film of claim 1, wherein the partition plate has a thickness of 5 μm-10 μm.

10. The liquid crystal film of claim 1, wherein each of the plurality of polygonal receiving spaces has a maximum lateral diameter of 30 μm-10 mm.

11. The liquid crystal film of claim 1, wherein the liquid crystal mixture is formed by mixing liquid crystal molecules, a chiral agent, and an adhesive polymer.

12. The liquid crystal film of claim 11, wherein the liquid crystal mixture further comprises microparticles.

13. The liquid crystal film of claim 1, wherein each of the first base layer and the second base layer comprises a polyethylene terephthalate (PET) film or a polycarbonate (PC) substrate.

14. The liquid crystal film of claim 1, wherein each of the first conductive layer and the second conductive layer comprises a transparent conductive layer.

15. The liquid crystal film of claim 1, wherein the liquid crystal mixture comprises a liquid crystal material selected from one of the following: a guest host (GH) liquid crystal, twisted nematic (TN) liquid crystal, vertically aligned (VA) liquid crystal, electronically controlled birefringence (ECB) liquid crystal, polymer-dispersed liquid crystal (PDLC) liquid crystal, polymer network liquid crystal (PNLC) liquid crystal, or polymer stabilized cholesteric texture (PSCT) liquid crystal.

16. The liquid crystal film of claim 4, wherein the polymer material comprises a UV-curable material.

* * * * *